Sept. 16, 1969  D. C. ANDERSON ET AL  3,466,957
APPARATUS AND METHOD FOR FORMING A STACK OF SHEETS
Filed Oct. 19, 1966
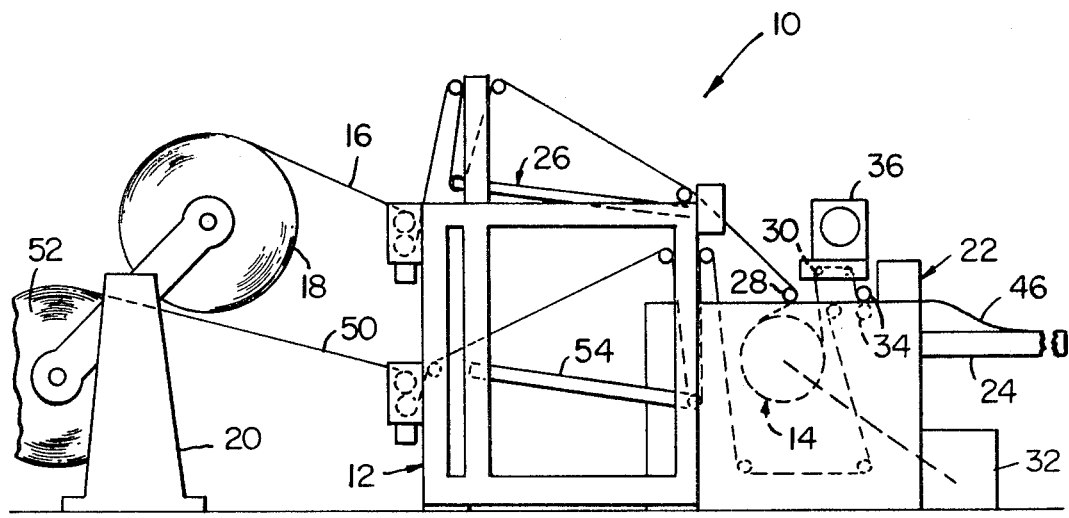
FIG_1
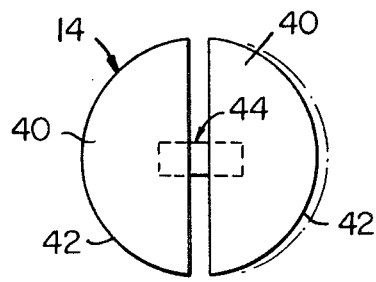
FIG_2
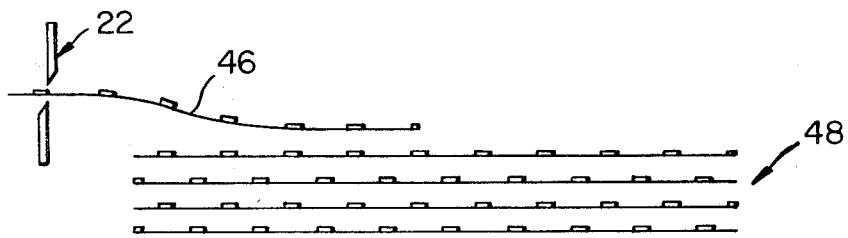
FIG_3
INVENTORS
DONALD C. ANDERSON
BY MATTHEW H. DEVINE
*Townsend & Townsend*
ATTORNEYS

# United States Patent Office 3,466,957
Patented Sept. 16, 1969

3,466,957
APPARATUS AND METHOD FOR FORMING A STACK OF SHEETS
Donald C. Anderson, Lafayette, and Matthew H. Devine, San Leandro, Calif., assignors to Hexcel Corporation, a corporation of California
Filed Oct. 19, 1966, Ser. No. 587,717
Int. Cl. B26d 7/06, 5/22, 5/20
U.S. Cl. 83—23
7 Claims

ABSTRACT OF THE DISCLOSURE

An apparatus for cutting web to exact predetermined length in which the web is wound about the circumference of a drum prior to being advanced to the cutting station in which the rotation of the drum determines the length of the web material to be cut and further, having means for changing the diameter of the drum to change the amount of web material advanced by predetermined arcuate drum movement.

---

This invention relates to improvements in sheet handling techniques and, more particularly, to apparatus and a method for forming a stack of sheets from a movable, flexible web.

The present invention resides in apparatus and a method for moving a flexible web in steps past a cutter, with the web being advanced with precision through a predetermined distance each time it is moved and with the cutter being actuated after the web has moved through this distance. In this way, sheets of a length equal to the aforesaid distance will be successively cut from the web and, as the sheets are successively collected in joggle box structure, they form the desired stack.

To provide the desired accuracy in measuring the sheet lengths, a rotatable drum is used to move the web through the predetermined distance. To this end, guide means is provided to cause successive portions of the web to be partially wrapped about the drum with the web being in frictional engagement therewith. Thus, the rotation of the drum causes the web to be advanced and the drum rotation is correlated to move the web through the above mentioned distance.

The drum is adjustable in circumference so that the distance through which the web passes each time the drum is rotated can be varied as required. By virtue of this feature, the sheets forming the stack will be of the proper length and this length can be periodically monitored to avoid the build up of cumulative errors.

While the apparatus and method of the invention are adapted for a wide range of uses, they are especially adapted for use in the manufacture of honeycomb core structure wherein a stack of sheets having glue lines thereon are subjected to an expansion process to form the honeycomb configuration. The glue lines define the points of contact of adjacent sheets and thereby the honeycomb cell boundaries. It is extremely important that these glue lines of each sheet be properly oriented with respect to the glue lines of adjacent sheets. Glue lines of alternate sheets must be vertically aligned to avoid irregularities in cell sizes and configurations.

Attempts in the past have been made to provide apparatus for accurately cutting a web into sheets of a fixed length so that, when the sheets are stacked, the glue lines on the sheets are properly aligned. For the most part, the prior structures have been costly to produce and maintain and cumbersome in operation. A need has, therefore, arisen for apparatus and a method for accomplishing this purpose in a simplified manner without sacrificing accuracy in forming the stack of sheets of the type mentioned above. The present invention meets this requirement by greatly simplifying the structure and the steps necessary to cut an advancing web into sheets of a predetermined length.

The advantages of the present apparatus and method stem from the use of the aforementioned drum whereby the web can be accurately moved through a measured distance as the drum rotates and before the cutter is actuated. The length of each sheet cut from the web remains substantially constant although this length can be continuously checked for accuracy. Moreover, accuracy in the formation of the stack is assured because of the precise way in which the rotation of the drum can be controlled.

The adjustment feature of the drum allows small changes to be made in the sheet length during operation of the apparatus. The resulting stack of sheets, therefore, has the proper dimensions and if the sheets are provided with glue lines, the glue lines will be properly aligned with each other if proper stacking techniques are used.

The primary object of this invention is to provide apparatus and a method for forming a stack of sheets from a movable, flexible web in a simplified manner and in a way which provides accuracy in maintaining the length of the sheets forming the stack substantially constant as the sheets are successively cut from the web.

Another object of this invention is to provide apparatus for forming a stack of sheets from a movable, flexible web wherein the web is partially wrapped about a drum and the drum is caused to rotate in steps and through a predetermined arc, each time it rotates, whereby the web will be intermittently advanced through a predetermined distance toward a cutter each time the drum rotates and the web will be progressively cut into sheets of the proper length and stacked for subsequent use.

A further object of the present invention is to provide a method of forming a stack of sheets wherein the step of wrapping a portion of a movable, flexible web around a drum is followed by the steps of rotating the drum and then cutting the web at a location downstream of the drum whereby the method is suitable for use in the high volume production of sheets which are to be stacked for use in any one of a number of different applications.

Other objects of this invention will become apparent as the following specification progresses, reference being had to the accompanying drawings wherein:

In the drawings:
FIG. 1 is a side, elevational view of the apparatus for forming a stack of sheets;
FIG. 2 is a schematic view of the drum showing the way in which its circumference can be varied; and
FIG. 3 is a schematic view of a stack of sheets formed by the apparatus.

Sheet handling apparatus 10, as shown in FIG. 1, includes a support 12 on which is rotatably mounted a drum 14 adjacent to the path of travel of a movable, flexible web 16. The web is initially wound on a roll 18 carried by a stand 20. The web is free to unwind from the roll and it passes by the support, partially about drum 14, and then past cutter means 22 by means on which it is cut into sheets of a predetermined length. The sheets fall into a joggle box 24 and are stacked thereon.

Support 12 has a dancer arm 26 pivotally mounted thereon which engages web 16 for maintaining a certain tension thereon. The web passes about spaced idler rolls between roll 18 and drum 14. It is guided onto the drum by spaced rolls 28 and 30 so that a portion of the web frictionally engages the outer surface of the drum. Thus, as the drum is rotated, the web is advanced toward cutter means 22. A motor 32 or other power source is coupled with the drum for rotating it in one direction. Control means (not shown) is provided to limit the rotation of drum 14 to a predetermined arc of precisely 360°.

A pair of nip rolls 34 are disposed on opposite sides of web 16 and are coupled to a power source for rotation in directions to advance the web toward cutter means 22. Nip rolls 34 are rotatable at a relatively high speed and are independent of the rotation of drum 14. Although nip rolls 34 are at rest when drum 14 is at rest, they are subject to the rotational force imparted thereto by their power source and thereby they bias the web in a downstream direction. Thus, they maintain a tension force on the web.

An optical comparator 36 is disposed adjacent to cutter means 22 to permit viewing of a horizontal stretch 38 of web 16. Comparator 36 is used to determine the position of indicia carried by the web relative to a reference mark forming a part of the comparator. When the indicia are not properly positioned, adjustments can be made to the circumference of drum 14 or to the path length of the web between the drum and cutter means 22 so that the indicia will be in a desired position.

Drum 14 is shown schematically in FIG. 2 to illustrate its circumference is changeable. For this purpose, drum 14 is comprised of a pair of sections 40, each having an arcuate outer surface 42 forming a portion of the outer circumference of the drum. Sections 40 are interconnected by adjustable coupling means 44 which may be of any suitable construction to permit the sections to move toward and away from each other. By moving away from each other, the sections provide a greater circumference for the drum. Conversely, the drum will decrease in circumference when the sections move toward each other. Means 44 may comprise gears, screws or the like.

The circumference of the drum determines the length of the web which is advanced for each rotation of the drum. For instance, if the drum makes one revolution each time it is rotated, a predetermined length of the web will be advanced. If the circumference of the drum is then increased and the drum rotated again through the one revolution, a greater length of the web will be advanced. A lesser length of the web will be advanced if the circumference of the drum is decreased. Providing that precision can be attained in adjusting the drum circumference, it is clear that sheet lengths can be realized with great accuracy since the rotation of the drum can be held precisely to a predetermined arc.

In operation, roll 18 is mounted on stand 20 and web 16 is manually unwound from the roll, moved past the various rolls on support 12, positioned partially about drum 14, and moved through nip rolls 34. The web is now in position to be progressively cut into sheets.

Power supply 32 is then actuated to rotate drum 14 in a counterclockwise direction when viewing FIG. 1. This action causes the web to be advanced toward cutter means 22. Power source 32 is controlled so that the drum rotates precisely through a predetermined arc, such as one revolution. Means is provided to brake the rotation of the drum as soon as the predetermined arc has been transversed. Cutter means 22 is then actuated to cut the web into a sheet having a length corresponding to the distance through which the web is advanced as the drum is rotated. The sheet cut from the web is denoted by the numeral 46 and is shown in FIG. 1 as it is partially received within joggle box 24.

Power source 32 is actuated in steps so that the drum is rotated intermittently with respect to support 12. Each time the drum rotates, it moves through the predetermined arc. Thus, the web advances a fixed distance each time the drum rotates and cutter means 22 is actuated after the drum has rotated through the aforesaid arc. Thus, a series of sheets 46 is cut and collected in a stack 48 in box 24.

If web 16 has transversed glue lines 50 thereon, these glue lines will be aligned in the manner shown in FIG. 3 when the same are stacked in box 24, provided that the length of each sheet 46 is equal to an odd number of half pitches. The pitch is equal to the distance between adjacent glue lines. This is illustrated in FIG. 3 wherein the length of each sheet 46 of stack 48 is equal to thirteen half pitches. It is clear that the glue lines of alternate sheets in stack 48 are vertically aligned as is required when the sheet is provided with glue lines on only one of its faces. FIG. 3 also shows the way in which a sheet passes cutter means 22 prior to being cut thereby.

Operation of the drum and cutter means continues until stack 48 has the proper number of sheets 46 therein. The operation is then stopped and the stack is removed to a storage location or to a point of use. For making honeycomb structure, the stack is subjected to an expansion process whereby the sheets are expanded while adjacent sheets remain interconnected at the glue lines.

Adjustments can be made to the drum and to the length of the web path between drum 14 and cutter means 22. To vary the drum circumference, adjustments in the operative position of means 44 are made so that drum sections 40 are moved toward or away from each other for a desired decrease or increase in the circumference.

The construction of means 44 is preferably such that the aforesaid adjustments can be made quickly by an operator while monitoring the operation of the apparatus. For this purpose, comparator 36 is provided and the proper steps can be taken to correct any errors in the length of the sheets cut from the web as is required or deemed desirable.

The aforesaid description relates to a web provided with glue lines on only one of its faces. Where web 16 is providede with glue lines on both of its faces, a second web 50, initially on a roll 52, can be used for forming sheets adapted to be interleaved between adjacent sheets having the glue lines. To this end, roll 52 is mounted on stand 20 and passed about a number of idler rolls including the roll of a dancer arm 54. Web 50 is then guided so that it moves between nip rolls 34 whereby it is in juxtaposition to web 16. Cutter means 22, therefore, severs both of the webs simultaneously and they fall as a unit into joggle box 24. By utilizing web 50, fewer sheets having glue lines thereon are required to thereby simplify formation of the sheet stack.

While several embodiments of this invention have been shown and described, it will be apparent that other adaptations and modifications can be made without departing from the true spirit and scope of the invention.

What is claimed is:

1. Apparatus for forming a stack of sheets from a movable, flexible web comprising: a drum adjacent to the path of travel of said web and mounted for rotation about an axis transverse to said path; means adjacent to said drum for guiding a portion of the web into a position partially wrapped about the drum and in frictional engagement therewith, whereby the web is advanced along said path through a predetermined linear distance each time the drum is rotated in one direction through a preselected arc; cutter means adjacent to said path downstream of the drum for cutting the web into a sheet having a length equal to said predetermined distance after each rotation of the drum through said preselected arc; means coupled with the drum for rotating the same a number of times in said one direction and through said preselected arc each time the drum is rotated, whereby the web may be advanced intermittently to permit successive sheets to cut therefrom; and means adjacent to said cutter means for stacking the sheets cut thereby.

2. Apparatus as set forth in claim 1, wherein said drum is provided with structure for varying its circumference.

3. Apparatus as set forth in claim 1, wherein said drum has a pair of relatively shiftable sections provided with arcuate outer peripheries defining at least the major portion of the circumference of the drum and means interconnecting the sections for movement toward and away from each other, whereby the circumference of the drum may be varied.

4. Apparatus as set forth in claim 1, wherein is provided means adjacent to said drum for guiding a second web into juxtaposition with the first-mentioned web at a location adjacent to said cutter means, whereby the webs are simultaneously cut by said cutter means to form a pair of sheets.

5. A sheet handling method comprising: wrapping a flexible web partially about a rotatable drum with the web in frictional engagement with the drum; rotating the drum in steps with the drum traversing through a predetermined arc each time it is rotated whereby successive portions of the web, each having a length corresponding to said arc, will be advanced along a path extending away from the drum; cutting the web each time after the drum has rotated through said arc to form a sheet having said length; and collecting the sheets from the web, juxtaposing a second web to the first mentioned web adjacent to said cutting zone, moving the second web with and through the same distance as the first web, and cutting the webs simultaneously to form a pair of sheets, said collecting means including stacking the pair of sheets.

6. Apparatus for forming a stack of sheets from a movable, flexible web comprising: a drum adjacent to the path of travel of said web and mounted for rotation about an axis transverse to said path; means adjacent to said drum for guiding a portion of the web into a position partially wrapped about the drum and in frictional engagement therewith, whereby the web is advanced along said path through a predetermined linear distance each time the drum is rotated in one direction; cutter means adjacent to said path for cutting the web into sheets of equal length; means coupled to the drum for rotating the drum in said one direction through precisely 360° whereby the web may be advanced intermittently to permit successive sheets to be cut therefrom; and means adjacent to said cutter means for stacking the sheets cut thereby.

7. An apparatus as set forth in claim 6 wherein said drum is provided with a structure for varying the circumference in order to vary the amount of material metered during a cycle of operation.

References Cited

UNITED STATES PATENTS

| | | | |
|---|---|---|---|
| 1,402,726 | 1/1922 | Wegner | 226—175 |
| 2,456,625 | 12/1948 | Cullin | 83—436 |

FOREIGN PATENTS 928,920  6/1955  Germany.

ANDREW R. JUHASZ, Primary Examiner

U.S. Cl. X.R.

83—42, 245, 267; 226—175